United States Patent
Dooley et al.

(10) Patent No.: US 7,948,139 B2
(45) Date of Patent: May 24, 2011

(54) MAGNETIC CONTROL CIRCUIT SEPARATION SLIT

(75) Inventors: Kevin Allan Dooley, Mississauga (CA); Joshua D. Bell, Toronto (CA)

(73) Assignee: Pratt & Whitney Canada Corp., Longueuil (CA)

( * ) Notice: Subject to any disclaimer, the term of this patent is extended or adjusted under 35 U.S.C. 154(b) by 1217 days.

(21) Appl. No.: 11/419,238

(22) Filed: May 19, 2006

(65) Prior Publication Data

US 2007/0267931 A1 Nov. 22, 2007

(51) Int. Cl.
*H02K 1/00* (2006.01)
(52) U.S. Cl. ................... 310/184; 310/216.106
(58) Field of Classification Search .................. 310/184, 310/216–218
See application file for complete search history.

(56) References Cited

U.S. PATENT DOCUMENTS

| | | | |
|---|---|---|---|
| 4,346,335 A | 8/1982 | McInnis | |
| 4,475,051 A * | 10/1984 | Chai et al. ................. | 310/49.44 |
| 4,763,034 A | 8/1988 | Gamble | |
| 5,030,877 A | 7/1991 | Denk | |
| 5,616,977 A | 4/1997 | Hill | |
| 5,742,106 A | 4/1998 | Muraji | |
| 5,917,248 A | 6/1999 | Seguchi et al. | |
| RE36,367 E * | 11/1999 | Nagate et al. ............ | 310/156.54 |
| 6,342,746 B1 | 1/2002 | Flynn | |
| 6,550,130 B2 | 4/2003 | Itoh et al. | |
| 6,936,948 B2 * | 8/2005 | Bell et al. ...................... | 310/201 |
| 6,965,183 B2 | 11/2005 | Dooley | |
| 2002/0084715 A1 | 7/2002 | Kakuta et al. | |

* cited by examiner

*Primary Examiner* — Dang D Le
(74) *Attorney, Agent, or Firm* — Ogilvy Renault LLP (57) ABSTRACT

An electric alternator/motor having a stator with at least two non-overlapping sectors is provided. Each sector includes a first winding, first and second magnetic circuits and a saturation control assembly. A cross-talk reduction feature, such as a peripheral slit is provided between each sector of the stator for impeding magnetic flux crossing between the sectors.

11 Claims, 8 Drawing Sheets

MAGNETIC CONTROL CIRCUIT SEPARATION SLIT

TECHNICAL FIELD

The invention relates to electric machines capable of operating at least as alternators, and in particular to the control of machines having a multi-channel design.

BACKGROUND

Electric machines can be provided with a multi-channel design. This multi-channel design permits a plurality of motor/alternators to exist within the same stator, and which may either be operated conjunctively, or preferably independently if of the general type described in applicant's U.S. Pat. No. 6,965,183, as desired. For example, in normal machine operation as a generator, the outputs of the winding sets may be combined to provide a single output, but in the event of a fault which requires one winding set (i.e. one generator channel) to be shut down, the remaining winding set(s) may continue operation unaffected. This feature thus permits more than one motor/generator to exist within the same machine, thereby providing redundancy which may very valuable in applications where a complete shutdown would be highly undesirable.

It is still desirable to improve the controllability and effectiveness of such electric machines, generally, and in particular permanent magnet (PM) machines having an independent multi-channel architecture.

SUMMARY

In one aspect, the present invention provides an electric alternator/motor comprising: a rotor having a plurality of permanent magnets; a stator having at least two non-overlapping sectors, each sector having a plurality of first slots and a plurality of second slots, the first slots being located on a periphery of the stator opposing the rotor, the second slots being located on an opposite side of the first slots relative to the rotor, at least a first winding disposed in a plurality of said first and second slots, at least a first magnetic circuit which encircles at least one first slot in which a portion the first winding is disposed, at least a second magnetic circuit encircling at least one of the second slots in which another portion of the first winding is disposed, the second magnetic circuit remote from the first magnetic circuit, at least a second winding disposed adjacent to the first winding in the plurality of second slots, a third magnetic circuit defined in the stator, the third magnetic circuit operatively associated with current passing through the second winding, and a current source connected to the second winding and adapted to pass current through the second winding to thereby cause magnetic flux to circulate third magnetic circuit; and at least one slit between each sector of the stator adjacent to the respective third magnetic circuits, each slit separating the third magnetic circuits of adjacent sectors and thereby adapted to impede magnetic flux crossing between the third magnetic circuit of each sector.

In another aspect, the invention provides a machine operable as at least one of an electric alternator/generator and an electric motor, the machine comprising a rotor and stator assembly, the assembly having a stator with at least two non-overlapping sectors, each sector including at least a first winding, first and second magnetic circuits and a saturation control assembly, the first magnetic circuit including the rotor and encircling at least a first portion of the first winding, the second magnetic circuit encircling at least a second portion of the first winding remote from the first magnetic circuit, the first and second magnetic circuits coupled when current flows in the first winding, the saturation control assembly of each sector being operatively associated with the corresponding second circuit and operable to controllably vary a saturation level of a portion of its associated second magnetic circuit, the saturation control assembly having a third magnetic circuit associated therewith which travels along a periphery of the stator, the respective the third magnetic circuits of the sectors being electromagnetically separated by at least one slit in said periphery of the stator.

In another aspect, the invention provides method of regulating an electrical output connected to a load, the method involving at least one alternator connected to the load, the alternator having a magnetic rotor, a stator having at least two non-overlapping sectors, each sector comprising a stator winding assembly confined to its respective sector, the stator winding assembly of each sector connected in parallel to said load, each winding associated with at least one magnetic circuit defined in the stator sector and traveling along a periphery of the stator sector, the method comprising the steps of: providing electromagnetic separation between the sectors to electromagnetic separate the peripheral portions of the respective magnetic circuits; and moving the rotor relative to the stator to generate an output current in the windings of the sectors.

BRIEF DESCRIPTION OF THE FIGURES

For a better understanding and to show more clearly how it may be carried into effect, reference will now be made by way of example to the accompanying figures, in which:

FIG. 4 is a block diagram illustrating the functional aspect of the alternator/motor machine of FIG. 2a; and FIG. 5 is an exploded perspective view of the windings and the stator of the dual-channel electric alternator of FIG. 2a.

DETAILED DESCRIPTION

Figure 2A:
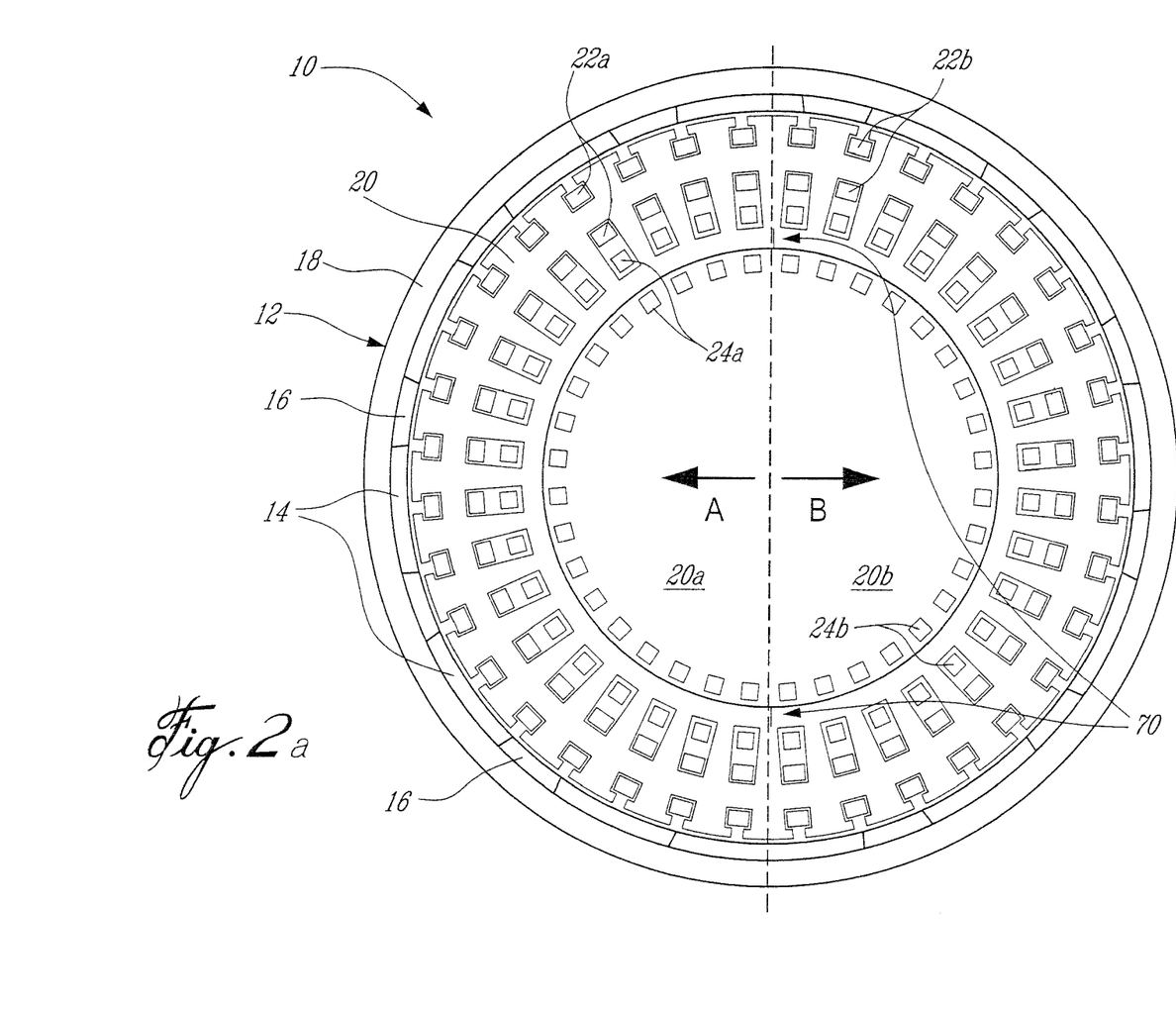
FIGS. 2a and 2b are a schematic views of an improved multi-channel electric alternator/motor machine.
Figure 2B:
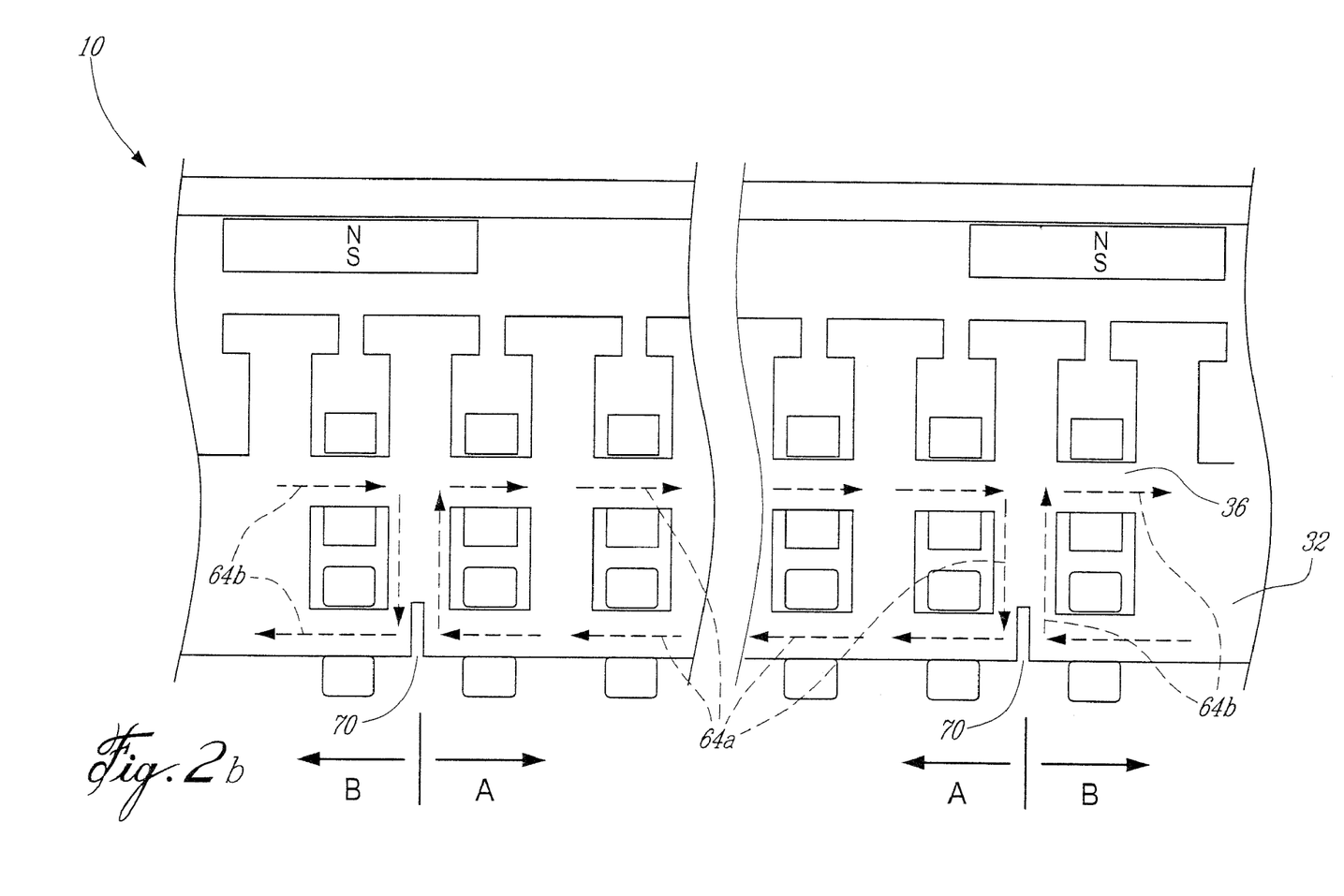

Referring first to FIGS. 2a and 2b, there is shown an example of a portion of a permanent magnet (PM) electric machine 10 as improved herein. For ease of illustration and description, FIG. 2b schematically shows a partial linear arrangement of the electric machine 10 of FIG. 2a. It will also be understood by the skilled reader that in FIGS. 2a and 2b, many routine details of the design have been omitted for clarity. The machine 10 may be configured as an alternator to generate electrical power, a motor to convert electrical power into mechanical torque, or both. The following paragraphs are directed to an electric machine operable as an alternator, but apply to a motor construction, as well.

In order that the dual channel machine of FIGS. 2a and 2b may be more easily understood, a simpler single-channel design of FIGS. 1a to 1c will first be described here. The machine 10 of FIGS. 1a to 1c has a rotor 12 with permanent magnets 14 interposed between yokes 16, which rotor 12 is mounted for rotation relative to a stator 20. A retention sleeve 18 is provided to hold the permanent magnets 14 and the yokes 16. It also provides a magnetic path behind the magnets 14. Stator 20 has at least one power winding 22 and preferably at least one control winding 24. In the illustrated embodiment, the stator 20 has a 3-phase design with three independent power windings 22 (the phases are denoted by the circled numerals 1, 2, 3, respectively in FIG. 1*b*) and, correspondingly, three control windings 24. The power windings 22 and control windings 24 are separated in this embodiment by a winding air gap 26 and are disposed in radial slot portions 28*a*, 28*b* of slots 28 provided in the stator 20 between adjacent teeth 30. For ease of illustration in FIGS. 1*a* and 1*b*, the adjacent elements of the control windings 24 are shown unconnected. Also, the adjacent slot portions 28*a*, 28*b* are indicated as A, B, C, etc. The first slot portions 28*a* are used for the power windings 22 only, and the second slot portions 28*b* are for both the power windings 22 and the control windings 24.

The power windings 22 are electrically insulated from the control windings 24. The insulation is provided, for instance, by a sheathing or a layer of insulation varnish or the like.

A back iron 32, also referred to as the control flux bus 32 in this application, extends between and at the bottom of the second slot portions 28*b*. A rotor air gap 34 separates rotor 12 and stator 20 in a typical fashion. A core or "bridge" portion, also referred to as the "power flux bus" 36 portion of stator 20 extends between adjacent pairs of teeth 30 to form the two distinct slot portions 28*a*, 28*b*. Power flux bus 36 divides the spare between adjacent teeth 30 to form the first slot portions 28*a* and the second slot portions 28*b*.

The materials for the PM machine 10 may be any one deemed suitable by the designer. Materials preferred by the inventor are samarium cobalt permanent magnets, copper power and control windings, a suitable saturable electromagnetic material for the stator teeth, such as electrical silicon steels commonly used in the construction of magnetic machines. The stator teeth, power and control flux busses may be integral or non-integral with one another, as desired.

Figure 1A:
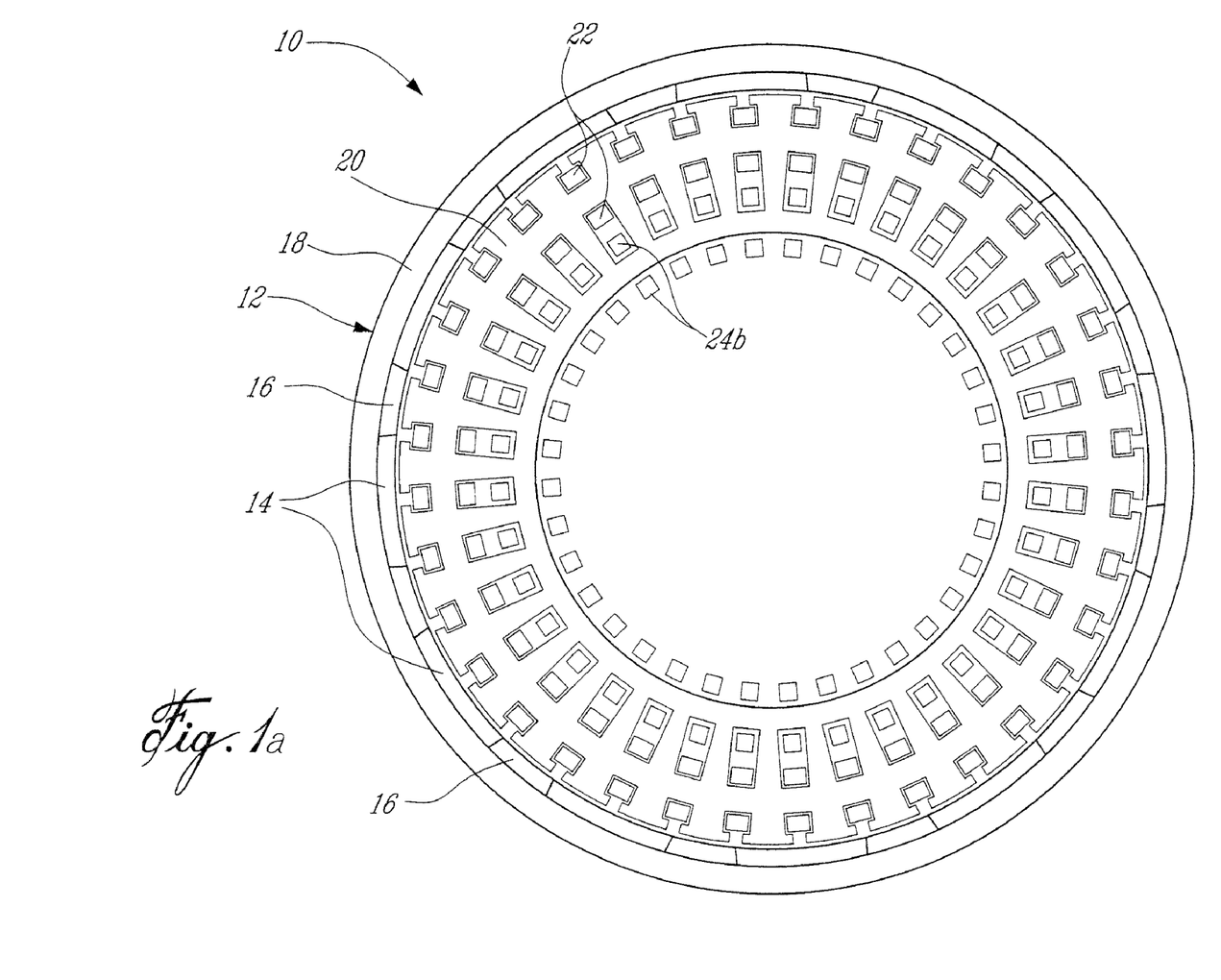
FIGS. 1a to 1c are a schematic views of an example of a single channel alternator/motor machine.
Figure 1B:
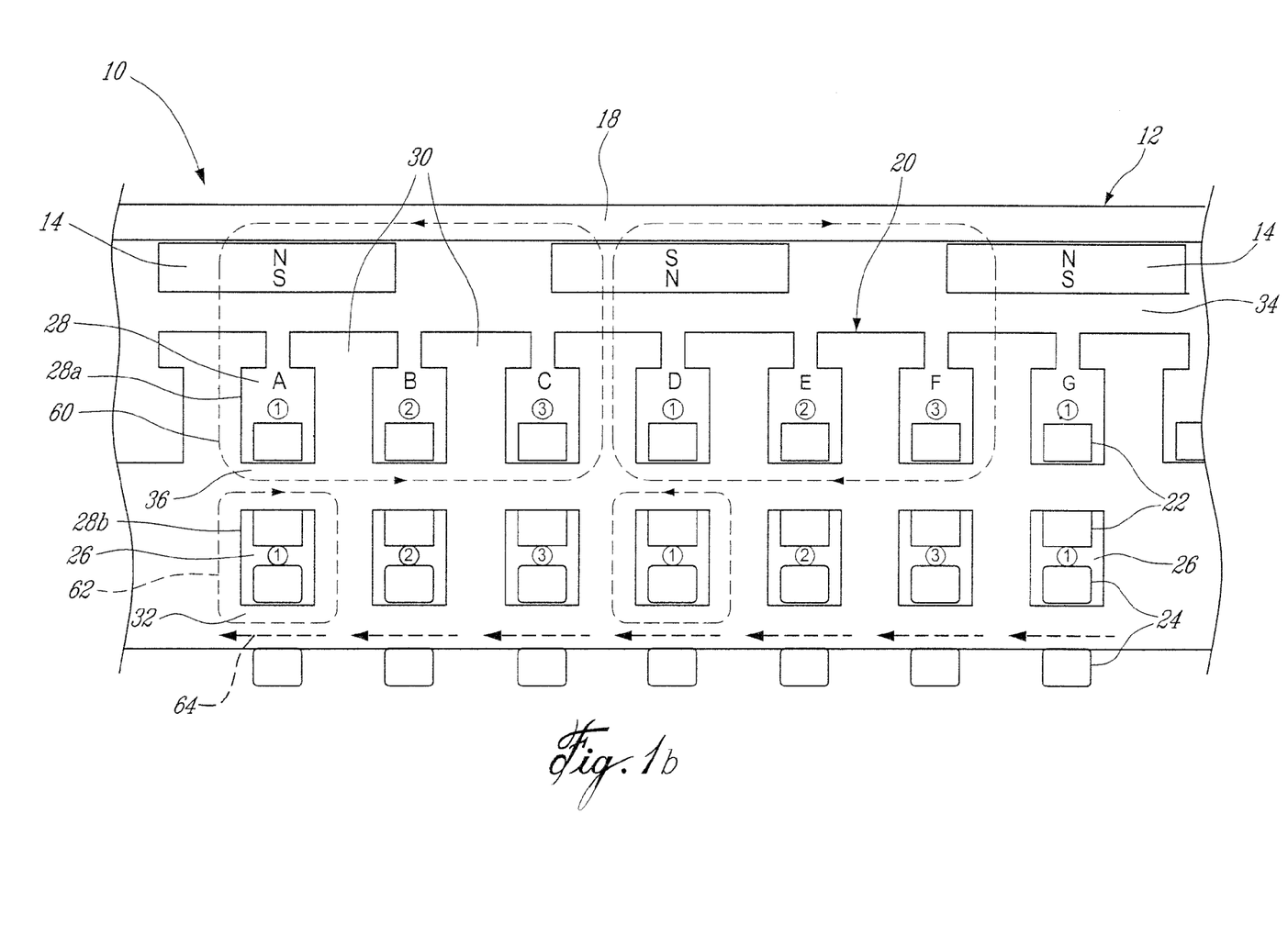
Figure 1C:
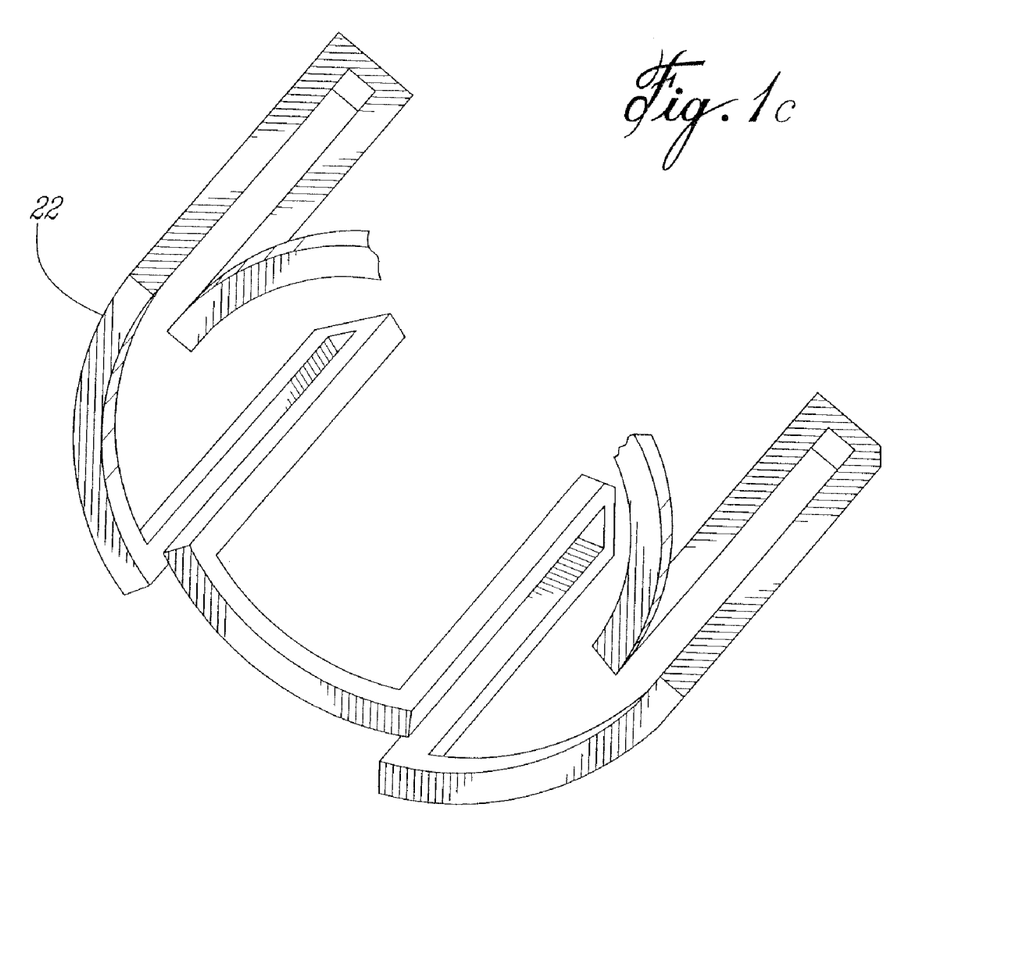

FIG. 1*c* shows an example of one of the power windings 22, positioned as it would be wound in the stator 20 in a three-phase configuration. Each of the power windings 22 in this embodiment consists of a single conductor which enters, for instance, the first slot portion 28*a* of a selected slot 28 (e.g. at slot "A" of FIG. 1*b*), extends through the slot and exits the opposite end of the slot, and then radially crosses the power flux bus 36 to enter the second slot portion 28*b* of the same slot 28 (e.g. at slot "A" of FIG. 1*b*), after which it extends back through the length of the selected slot, to exit the second slot portion 28*b*, and hence exits the slot 28 on the same axial side of the stator as it entered. The conductor of power winding 22 then proceeds to the second slot portion 28*b* of the next selected slot 28 (e.g. slot "D" in FIG. 1*b*), where the power winding 22 then enters and passes along the slot 28, exits and radially crosses the power flux bus 36, and then enters the adjacent first slot portion 28*a* of the selected slot 28, and then travels through the slot again to exit slot portion 28*a* and the stator adjacent where the winding entered the second slot portion 28*b* of the selected slot 28. The power winding then proceeds to the next selected slot 28 (e.g. slot "G" in FIG. 1*b*), and so the pattern repeats. A second power winding 22 corresponding to phase 2 (not shown), begins in an appropriate selected slot (e.g. slot B of FIG. 1*b*) and follow an analogous path, but is preferably wound in an opposite winding direction relative to winding 22 of phase 1. That is, the phase 2 winding 22 would enter the selected slot (slot B) via second slot portion 28*b* (since phase 1 winding 22 entered slot A via first slot portion 28*a*, above), and then follows a similar but opposite path to the conductor of phase 1, from slot to slot (e.g. slots B, E, etc.). Similarly, the phase 3 winding 22 is preferably oppositely-wound relative to phase 2, and thus enters the selected slot (e.g. slot "C") of the stator via first slot portion 28*a*, and follows the same general pattern as phase 1, but opposite to the pattern of phase 2, from slot to slot (e.g. slots C, F, etc.). Thus, as mentioned, the phases of the power winding 22 are oppositely-wound relative to one another, for reasons described further below.

Meanwhile, a control winding(s) 24 is wrapped around the control flux bus 32, in a manner as will now be described. In this embodiment, control winding 24 preferably forms loops wrapped preferably multiple times around the control flux bus 32, such as 25 times to provide a 25:1 control-to-power winding turns ratio, for reasons described below. The direction of winding between adjacent second slot portions 28*b* is preferably the same from slot to slot, and thus alternatingly opposite relative to the power winding 22 of a same phase wound as described above, so that a substantially net-zero voltage is induced in each control winding 24, as will also be described further below. Preferably, all loops around the control flux bus 32 are in the same direction. Note that the control winding 24 does not necessarily need to be segregated into phases along with the power windings, but rather may simply proceed adjacently from slot to slot (e.g. slots A, B, C, D, etc.). Alternately, though not segregated into phase correspondence with power windings 22, it may be desirable to provide multiple control windings, for example, to reduce inductance and thereby improve response time in certain situations. Preferably, several control windings 24 are provided in a series-parallel arrangement, meaning the control windings 24 of several slots are connected in series, and several such windings are then connected in parallel to provide the complete control winding assembly for the machine. Although it is preferred to alternate winding direction of the power windings, and not alternate direction of the control windings, the power and control windings are preferably wound in relative opposite directions and in equal slot numbers to ensure a substantially net-zero voltage is induced in each control winding 24 as a result of current flow in the power windings 22, so that the function described below is achieved. The control winding(s) 24 is(are) connected to a current source 50 (see FIG. 3), which in this example includes a variable current DC source and an appropriate solid state control system preferably having functionality as described further below. If there is more than one control winding 24, each control winding 24 can be connected to the same current source 50, or connected to a respective one. The approximate current required from such source is defined primarily by the power winding output current required and the turns ratio the power and control windings, as will be understood by the skilled reader in light of this disclosure.

Figure 3:
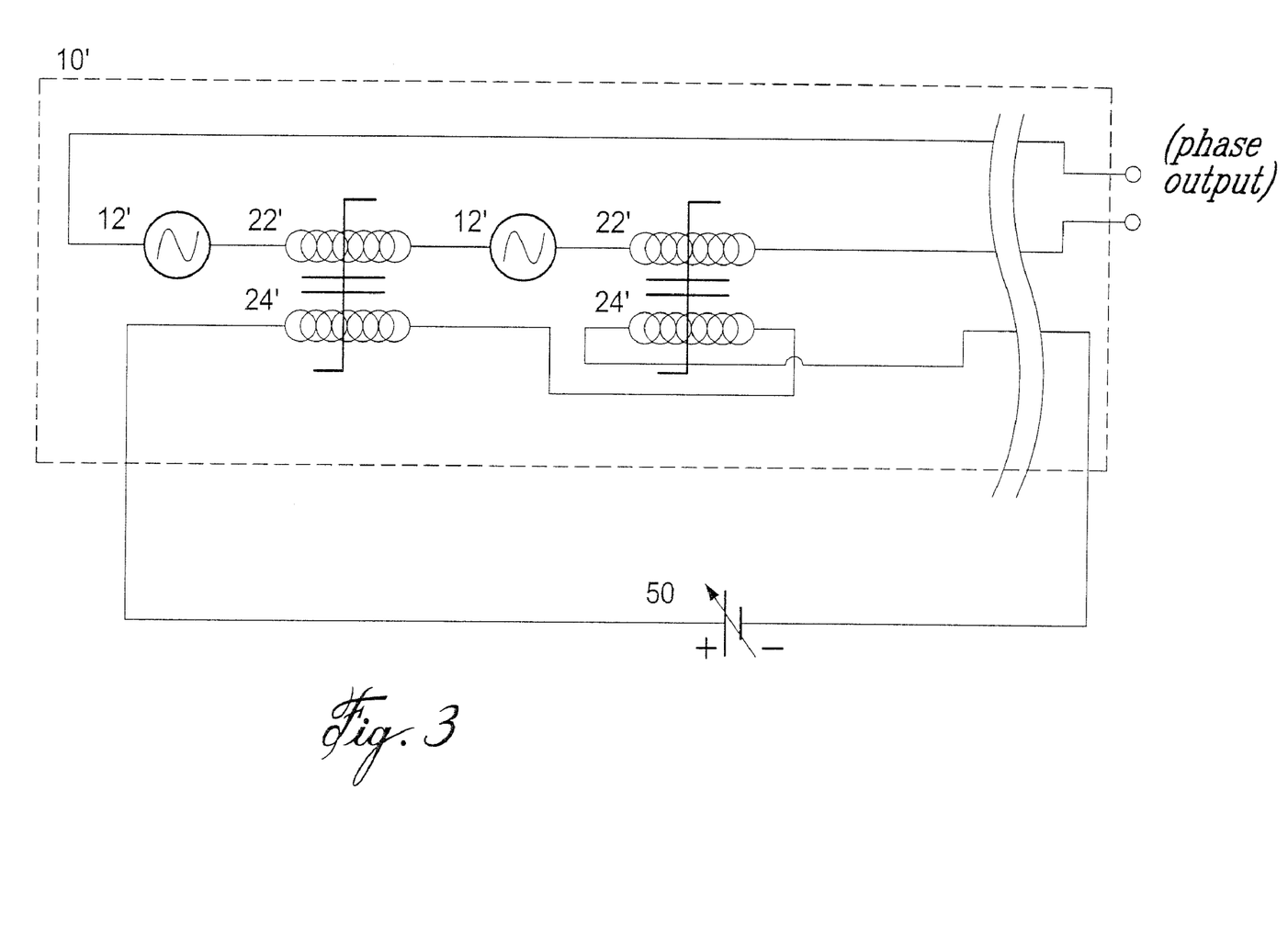
FIG. 3 is a schematic view of a partial equivalent circuit of the alternator/motor machine of FIG. 1, illustrating its functional aspects.
Figure 4:
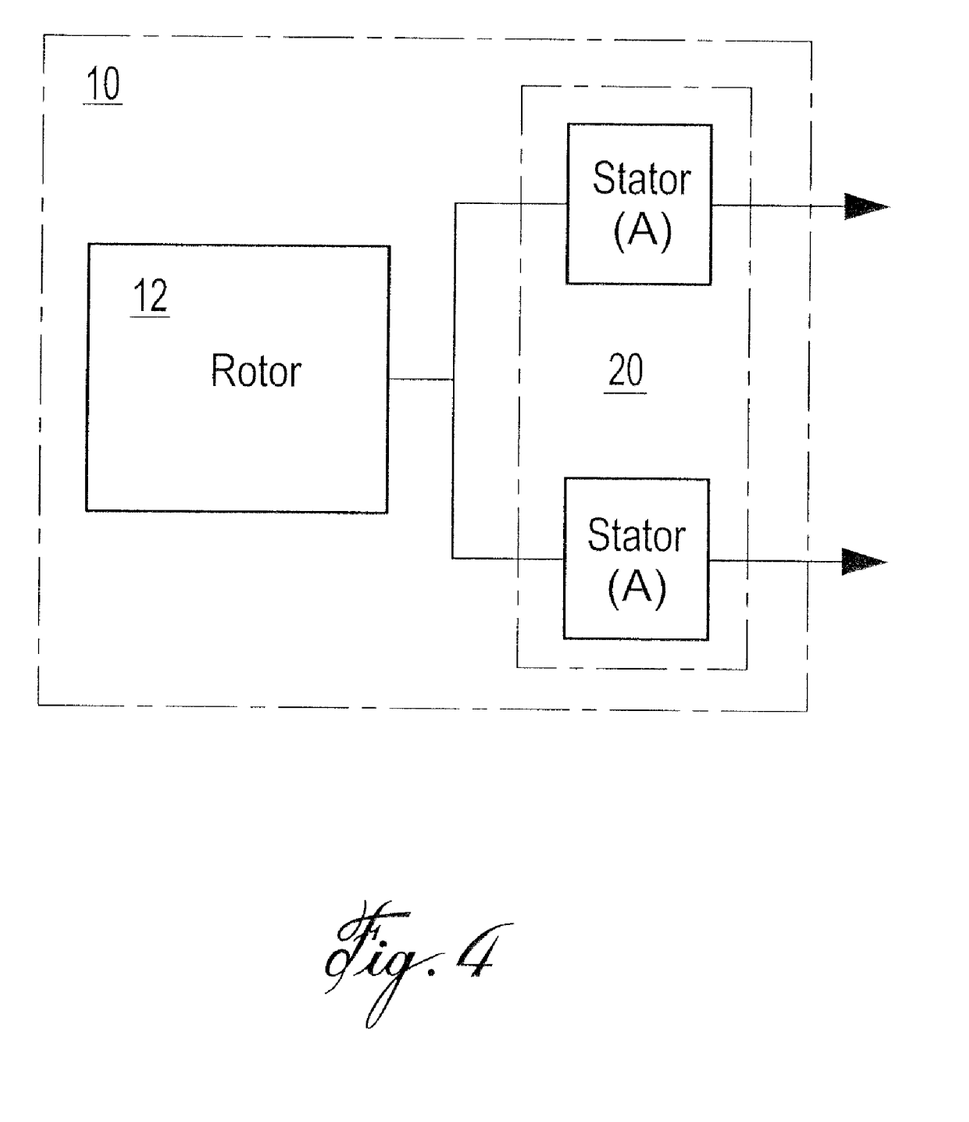

Referring still to FIG. 3, each phase of the machine 10 can be represented by an approximately equivalent circuit 10' having a plurality of alternating current sources 12' (i.e. each, equivalent to the moving magnetic rotor system in conjunction with the portion of a power winding 22 located in the first slot portion 28*a*) connected to a plurality of power inductors 22' (i.e. equivalent to the portion of the primary winding 22 located in the second slot portion 28*b*), the current sources 12' and power inductors 22' arranged alternately in series. Associated with power inductors 22' are a plurality of control inductors 24' (i.e. equivalent to control winding 24) having saturable cores (equivalent to the saturable control flux bus 32). Control inductors 24' are connected to a variable DC current source and control system in this example, represented by 50. Therefore, one can see that the power winding(s) 22, the control winding(s) 24 and the control flux bus 32 co-operate to provide a saturable core inductor within the stator 20. The saturable core inductor, in conjunction with other electromagnetic effects, described further below, provides an integrated approach to implementing the power regulation schemes described below.

Referring again to FIG. 1b, when the machine 10 is used in an alternator mode, rotor 12 is moved (i.e. by a prime mover) relative to stator 20. The interaction of magnets 14 and the portions of the stator forming the primary magnetic circuit, creates a primary magnetic flux within PM machine 10 along a primary magnetic flux path or magnetic circuit 60. The primary flux induces a voltage in the power winding 22 which, when an electrical load is connected, results in an induced current and the induced current causes a secondary magnetic flux to circulate an adjacent secondary magnetic flux path or magnetic circuit 62. The primary circuit 60 and the secondary circuit 62 are thus coupled when a current flows in the power winding 22. The secondary magnetic circuit 62 is for the most part isolated from the rotor 12 and the primary magnetic circuit 60. It is to be understood that this description applies only to phase "1" of the 3-phase illustrated embodiment, and that similar interactions, etc. occur in respect of the other phases. Primary magnetic circuit 60 includes rotor 12, rotor air gap 34, power flux bus 36 and the portion of stator teeth 30 between rotor 12 and power flux bus 36. Primary magnetic circuit 60 encircles a portion of the power winding 22 and, in use as an alternator, causes a current flow in the power winding 22. Secondary magnetic circuit 62 includes power flux bus 36, control bus 32 and the portion of stator teeth 30 between control bus 32 and power flux bus 36. In this embodiment, the secondary magnetic circuit 62 encircles the portions of the power winding 22 and the control winding 24 in the second slot portion 28b. The primary magnetic circuit 60 encircles the first slot portion 28a while the secondary magnetic circuit 62 encircles the second slot portion 28b. The first slot portion 28a is preferably radially closer to the rotor 12 than the second slot portion 28b.

Power flux bus 36 is preferably common to both the primary and secondary magnetic circuit paths, but need not be so. If desired, the power flux bus 36 may be separated from the upper portion of the secondary flux path along the direction of flux lines so that the secondary magnetic circuit 62 be physically separated from the primary magnetic circuit (not shown).

A tertiary magnetic circuit 64 preferably circulates around control bus 32, as partially indicated in FIG. 1b (i.e. only a portion of the tertiary circuit is shown), as the tertiary circuit of the machine of FIGS. 1a to 1c circulates through the entire stator 20, i.e. around its entire circumference. The control flux bus 32 is preferably common to both the secondary and tertiary magnetic circuit paths and thus the secondary and tertiary magnetic circuits are coupled. At least a portion of control flux bus 32 is saturable by the flux density of the tertiary magnetic circuit. When operated as an alternator, the machine 10 permits the output of the power winding(s) 22 to be controlled through a manipulation of current supplied to the control winding(s) 24, as will now be described.

As explained above, the equivalent power inductor 22' is formed by the portion of the power winding 22 in the second slot portion 28b and the secondary magnetic circuit 62, as schematically represented by the equivalent circuit of FIG. 3. The control winding 24 shares the secondary magnetic circuit 62, however since it is preferably wound in the same direction around the control flux bus 32 in each second slot portion 28b, as mentioned above, the resulting effect achieved is similar to that provided by alternatingly reversed saturable inductors, and there is preferably substantially no net voltage generated within the control winding 24 by flux in the secondary magnetic circuit 62.

The application of a DC current from the source 50 to the control winding 24 results in a DC flux circulating circuit 64 in the control flux bus 32. At the instant in time depicted in FIG. 1b, it can be seen that the DC flux in tertiary magnetic circuit 64 in the control flux bus 32 is in the same direction in slot A as the AC flux in secondary magnetic circuit 62, but in slot D the direction of the DC flux in tertiary magnetic circuit 64 in the control flux bus 32 is opposite to the AC flux in secondary magnetic circuit 62. As the DC current is increased in the control winding 24, the flux density in the control bus 32 is increased such that the saturation flux density is eventually reached. It will be understood that saturation is reached first in the regions in the control flux bus 32 where the AC flux and the DC flux are in the same direction, and that at higher DC control currents both regions of the control flux bus 32 become saturated regardless of flux direction, if the current in the power phase winding is not sufficient to prevent saturation in the areas where the flux is in opposite directions. If the current in the power windings is increased above the point where saturation of both regions is achieved, one of the regions will come out of saturation. Once saturation occurs, the AC flux in the secondary magnetic circuit 62 due to the current in the power winding 22 is very significantly reduced.

As mentioned, the winding pattern of the control winding 24 relative to the power winding 22 preferably results in a near net zero voltage induced in the control winding 24, which simplifies control. Also, since the DC control current through the control flux bus 32 produces magnetic fluxes in different directions relative to the power winding 22, one portion of the control flux bus 32 will saturate more in one half cycle of the AC power while another portion of the control flux bus 32 will saturate more in the other half cycle, thus tending to equalize the control action through each half-cycle.

Once saturated, magnetic materials substantially lose their ability to conduct additional magnetic flux, and as such appear to be almost non-magnetic to both AC magnetic forces ($H_{AC}$) and further changes in DC magnetic influence ($H_{DC}$). The net effect of this saturated condition in the control flux bus 32 is thus to virtually eliminate the inductance due to the secondary magnetic circuit 62, which thereby significantly reduces inductance of the machine 10.

Furthermore, as the current flow in the power winding 22 increases, for example due to an increase in the external load or an increase in the generated output voltage due to an increase in operating speed, the portion of the control flux bus 32 in which the flux directions are instantaneously opposing will become less saturated, which causes a proportional increase in the inductance. This effect tends to cause the output current to remain somewhat constant. Thus the power output current of the alternator to become a function of the control current. The maximum inductance of the equivalent power inductor 22' formed by the secondary magnetic circuit 62 is related to the physical dimensions and materials of the stator portions carrying the secondary magnetic circuit 62. The power winding current limit is related to the current in the control winding by:

$$I_P = K + [I_C * N_C / N_P]$$

where: $N_P$ and $N_C$ are the number of turns in the power and control windings, respectively, $I_P$ and $I_C$ are the currents in the power and control windings, respectively, and K is a constant which is inversely proportional to the maximum inductance of the power winding and other machine design features, as will be appreciated by the skilled reader.

This permits manipulation of the output of power winding 22, and thus control winding 24 may be used as a source of control of PM machine 10. Means for controlling the operation of PM machine 10 are thus available within the machine itself, as the "control" current may be generated by the power windings 22 of the PM machine 10, typically in conjunction with rectifiers. In some instances, an external source of control current may be required or desired, in conjunction with an electronic current control, although arranging the control winding 24 in series with the rectified output current may also be used to regulate output voltage to some extent. The architecture therefore lends itself to many novel possibilities for control systems for the machine 10, a few examples of which will now described.

For example, the output (i.e. from a power winding 22) of alternator 10 may be controlled by connecting the control winding 24 to a power supply 50, and a current applied to the control winding 24 preferably sufficient to saturate the control flux bus 32 at a desired power winding current, such saturation being caused by magnetic flux flowing along tertiary path 64 induced by current passing though control winding 24, which is wrapped around control flux bus 32 in this embodiment. When saturation occurs, AC flux around the secondary magnetic circuit 62 is effectively eliminated, and the magnetic relationship between the power winding 22 and the secondary magnetic circuit 62 is such that inductance due to the secondary magnetic circuit in the power winding 22 is virtually eliminated. Thus, more current is permitted to flow in the power winding 22 than would flow without the saturating flux developed by the controlled DC current source. This increase in power winding current will be limited at the point where the fluxes in opposing directions become essentially equal in magnitude, resulting in de-saturation of the secondary magnetic circuit portions where this flux equalisation condition occurs at that particular instant. The de-saturation effect results in an abrupt increase in the inductance at the instant corresponding to opposing flux equalisation, which in turn limits the power winding current to the corresponding current value. Therefore, the current level provided by controlled current source supply 50 can be continuously varied, as required, to regulate the output current of the power winding 22 (and thus, ultimately, output voltage) over a range of rotor speeds and electrical loads. In order to effect constant output voltage control, for example, a feedback control circuit (discussed further below) is used by the control system of source 50 to compare the alternator output voltage (i.e. the output of power winding 22) to a fixed reference (e.g. representative of a desired output voltage level(s)), and control can be configured such that, when the alternator output voltage is less than a desired reference level, a command is provided to increase the control current to increase saturation (thus de-saturation) level and therefore output current, and thus the output voltage across a given output load.

Magnetic flux preferably circulates the tertiary magnetic circuit 64 in the same direction around the entire circumference of the machine 10, through the control flux bus 32. As mentioned above, although the control winding 24 is provided in the second slots portion 28b corresponding to a particular phase of the three-phase machine described, the power windings 22 are wound in the opposite direction in each first slot portion 28a which is due to the opposite polar arrangement of the magnets 14 associated with each adjacent first slot portion 28a of the phase. To ensure that a uniform direction for the tertiary magnetic circuit 64 is provided, as mentioned, the control windings 24 are preferably wound in the same direction in all second slot portions 28b. Also as mentioned, a net-zero voltage is induced in the control winding 24, which is desirable because a relatively low DC potential is then required to provide DC control currents, thus no special considerations are required to remove a significant AC potential on the control winding 24.

Turning now to FIGS. 2a, 2b, 4 and 5, an improved multi-channel design of machine 10, of the general type described in applicant's U.S. Pat. No. 6,965,183 as modified in accordance with the present teachings, will now be discussed.

Referring to FIGS. 2a and 2b, a 3-phase, dual "channel" machine is depicted, and will now be described in more detail. The "dual channel" machine 10' has two (in this embodiment) circumferentially distributed, distinct sectors with fully independent 3-phase sets of primary windings 22a, 22b and associated secondary windings 24a, 24b are provided in stator 20. Stator 20 is similar to the stator of FIGS. 1a to 1c, but is conceptually divided into two sectors 20a and 20b, denoted in FIG. 2a by the stippled line bisecting the stator. The separate winding sets 22a/22b and 24a/24b of each channel, i.e. channels "A" and "B", are confined to these separate sectors 20a, 20b of the machine, which thereby provides a "two-in-one" or dual-channel machine. Each of the two sets of 3-phase windings 22a, 22b is independently controllable and thus have the effect similar to as if two distinct machines were provided. As discussed in applicant's U.S. Pat. No. 6,965,183, this multi-channel architecture permits a plurality of independently controllable alternator sectors to exist within the same stator, and which may either be operated conjunctively or independently as desired. This feature thus permits more than one functional "machine" to exist within the same stator structure.

As aforesaid, the electric machine 10 of FIGS. 2a-2b has a single rotor 12 but two or more independent sectors in the stator 20, providing channels A and B. These channels are independently controlled so that if one has a failure, the other can continue its normal operation and may perhaps be operated to compensate for the loss of the other. The output of the channels, in normal operation, can be either combined to provide a single output, or be used to supply different electrical devices independently, as desired. In a gas turbine application, this dual- or multi-channel design permits a fully redundant system (system A+system B, in FIG. 4) to be provided with a minimum of hardware, thereby minimizing weight and space and increasing reliability. Among other things, this offers inherent redundancy useful in aerospace applications. As well, since generator efficiency is inversely proportional to $I^2R$ losses, it is often preferable to run two machines, each at ½ of the output current, rather than one machine a full output current.

As discussed with respect to the machine in FIGS. 1a-1c, the tertiary magnetic circuit of that machine encircles the entire circumference of the stator, however in the multi-channel design of FIGS. 2a-2b, there is not the case. Referring to FIG. 2b, since control windings 24a and 24b are independent, and respectively interact with independent windings 22a and 22b, separate tertiary magnetic circuits 64a and 64b result in dual-channel machine 10. The tertiary magnetic circuits 64a/64b instead travel along the entire length of the control flux bus 32 to the channel boundary (indicated by the stippled line in FIG. 2a), where it then tends to turn up to the power flux bus 36, where it then travels back along entire length of the power flux bus 36 until the path joins up again with the beginning of the tertiary magnetic circuits 64a, 64b, as the case may be. For clarity, the primary and secondary magnetic circuits are not indicated in FIG. 2b. At the boundary between channels, however, there is a potential for flux leakage, or "crosstalk", between the magnetic flux circulating tertiary magnetic circuits 64a and 64b.

To reduce the occurrence of such crosstalk, a stator features or features such as a slit 70 is provided in the control bus 32 between each channel of the machine 10. Since the illustrated embodiment has two sections A, B, two slits 70 are provided. The slits 70 can be made by machining, using for instance a cutoff saw or wire EDM. If desired, each slit 70 may be filled with a solid non-magnetic material, which will help seal the area when a coolant fluid is circulated in the machine 10, or may be filled with a magnetic material but of preferably much lower magnetic permeability. The slits 70 can also be formed during the lamination stamping process.

In use, when slits 70 are provided, the flux circulating tertiary magnetic circuits 64a and 64b can be electromagnetically separated more effectively, and thus allow the channels to be operated more independently, since the slits 70 substantially impede the transfer of magnetic flux across the limit between the channels. Without the slits 70, the magnetic flux tends to stray somewhat into adjacent channels of the machine 10, given that the control bus 32 is made of a highly permeable magnetic material. This crosstalk can interfere with the independent control may reduce the ability of optimally controlling one section if the other has a fault, or vice versa. The presence of a cross-talk reduction feature, such as stator slit 70, acts to substantially contain the tertiary magnetic within the channel. Where more than two channels are provided, preferably at least cross-talk reduction feature is provided at each boundary. Although the cross-talk reduction features need not be exactly co-located with each boundary, it is generally preferred that they are.

The cross-talk reduction feature(s), such as slit 70, is preferably designed to effectively limit crosstalk between channels to the extent required to meet the design objectives. The design, shape, size and construction of such feature will depend in large part on the machine design and operating parameters. Here, for example, the slits 70 will preferably have a width and depth required to meet the disclosed objectives. In this design, the radial depth of slits 70 extend to a radius or level about even with the bottom of second slot portions 28b.

Figure 5:
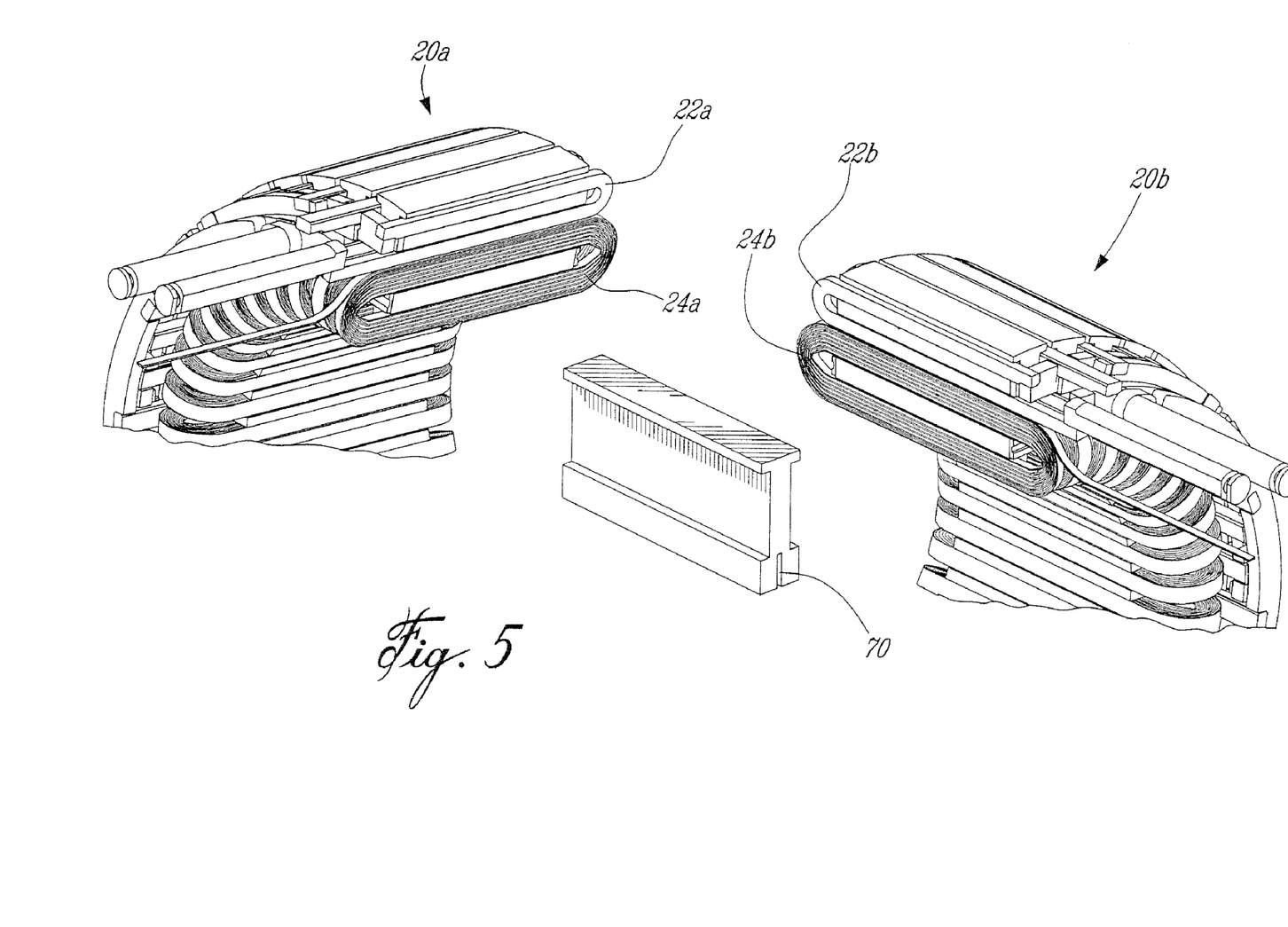

FIG. 5 shows an exploded view of the stator power windings 22a, 22b of the dual-channel three-phase electric machine of FIGS. 2a and 2b, and the control slit 70.

The above description is therefore meant to be exemplary only, and one skilled in the art will recognize that other changes may also be made to the embodiments described without departing from the scope of the invention disclosed as defined by the appended claims. For instance, the present invention is not limited for use with a dual-channel machine as machines can have more than two channels in some designs. The windings may have single or multiple turns per slot, the number of turns of a winding not necessarily has to be a whole number. The number of power windings does not necessarily have to equal the number of control windings, and one or more windings may perhaps be present in a slot. The windings may be any conductor(s) (i.e. single conductor, more than one wire, insulated, laminated, Litz etc.) or may be superconductors. In multiphase machines, there may be delta or Y-connected windings in accordance with known techniques. There need not be an air gap between the power and control windings, as long as the windings are electrically isolated from one another. The rotor can be any electromagnetic configuration suitable (i.e. permanent magnet rotor not necessary), and may be provided in an outside or inside configuration, or any other suitable configuration. Other winding configurations are possible, and the ones described above need not be used at all, or throughout the apparatus. Also, the magnetic circuits described can be arranged in the stator (and/or rotor) in any suitable manner. Likewise, the stator and rotor may also have any suitable configuration. Any suitable saturation means may be used. Although a DC source is preferred for control of saturation in some embodiments described above, an AC source may also be used in certain circumstances to achieve desired results, as the skilled reader will understand. Still other modifications which fall within the scope of the present invention will be apparent to those skilled in the art, in light of a review of this disclosure, and such modifications are intended to fall within the appended claims.

What is claimed is:

1. An electric alternator/motor comprising:
a rotor having a plurality of permanent magnets;
a stator having at least two non-overlapping sectors, each sector having a plurality of first slots and a plurality of second slots, the first slots being located on a periphery of the stator opposing the rotor, the second slots being located on an opposite side of the first slots relative to the rotor, at least a first winding disposed in a plurality of said first and second slots, at least a first magnetic circuit which encircles at least one first slot in which a portion the first winding is disposed, at least a second magnetic circuit encircling at least one of the second slots in which another portion of the first winding is disposed, the second magnetic circuit remote from the first magnetic circuit, at least a second winding disposed adjacent to the first winding in the plurality of second slots, a third magnetic circuit defined in the stator, the third magnetic circuit operatively associated with current passing through the second winding, and a current source connected to the second winding and adapted to pass current through the second winding to thereby cause magnetic flux to circulate third magnetic circuit; and
at least one slit between each sector of the stator adjacent to the respective third magnetic circuits, each slit separating the third magnetic circuits of adjacent sectors and thereby adapted to impede magnetic flux crossing between the third magnetic circuit of each sector.

2. The electric alternator/motor of claim 1, wherein there are two sectors and two slits, the sectors of equal size and the slits diametrically opposed on the stator.

3. The electric alternator/motor of claim 1, wherein the slits are defined in a periphery of the stator.

4. The electric alternator/motor of claim 1, wherein the slits extend radially into the stator to a depth substantially aligned with a periphery of the second slots.

5. The electric alternator/motor of claim 1, wherein each slit is filled with a material having a lower magnetic permeability than the surrounding stator material in which the slit is provided.

6. The electric alternator/motor of claim 1, wherein each slit is filled with a solid non-magnetic material.

7. A machine operable as at least one of an electric alternator/generator and an electric motor, the machine comprising a rotor and stator assembly, the assembly having a stator with at least two non-overlapping sectors, each sector including at least a first winding, first and second magnetic circuits and a saturation control assembly, the first magnetic circuit including the rotor and encircling at least a first portion of the first winding, the second magnetic circuit encircling at least a second portion of the first winding remote from the first magnetic circuit, the first and second magnetic circuits coupled when current flows in the first winding, the saturation control assembly of each sector being operatively associated with the corresponding second circuit and operable to controllably vary a saturation level of a portion of its associated second magnetic circuit, the saturation control assembly having a third magnetic circuit associated therewith which travels along a periphery of the stator, the respective third magnetic circuits of the sectors being electromagnetically separated by at least one slit in said periphery of the stator.

8. The machine of claim 7, wherein the saturation control assembly includes at least a second winding and a variable output current source connected to the second winding, current in the second winding resulting in magnetic flux circulating the third magnetic circuit, wherein the second winding is provided in the stator such that when a current level in the second winding is varied, the saturation level of said saturable portion is varied.

9. The machine of claim 7, wherein there are two sectors and two slits, the sectors being of equal size and the slits being diametrically opposed on the stator.

10. The machine of claim 7, wherein the slits extend radially into the stator to a depth substantially aligned with a periphery of the second slots.

11. The machine of claim 7, wherein each slit is filled with a material having a lower magnetic permeability than the surrounding stator material in which the slit is provided.

\* \* \* \* \*